(12) United States Patent
Weber et al.

(10) Patent No.: US 9,038,528 B2
(45) Date of Patent: May 26, 2015

(54) DEVICE FOR THE PULSED RELEASE OF AN AMOUNT OF FLUID THAT IS STORED IN A STORAGE HOUSING

(75) Inventors: Norbert Weber, Sulzbach/Saar (DE); Norbert Lange, Saarbrücken (DE)

(73) Assignee: HYDAC TECHNOLOGY GMBH, Sulzbach/Saar (DE)

( * ) Notice: Subject to any disclaimer, the term of this patent is extended or adjusted under 35 U.S.C. 154(b) by 1339 days.

(21) Appl. No.: 12/654,994

(22) Filed: Jan. 12, 2010

(65) Prior Publication Data

US 2011/0088548 A1 Apr. 21, 2011

(30) Foreign Application Priority Data

Oct. 19, 2009 (DE) .......................... 10 2009 050 833

(51) Int. Cl.
*F15B 15/26* (2006.01)
*F15B 1/04* (2006.01)

(52) U.S. Cl.
CPC ............... *F15B 1/04* (2013.01); *F15B 2201/21* (2013.01); *F15B 2201/31* (2013.01); *F15B 2201/40* (2013.01); *Y02E 60/15* (2013.01)

(58) Field of Classification Search
CPC ............. F15B 2201/21; F15B 2201/40; F15B 2201/31; F15B 1/04; Y02E 60/15

USPC .............................................. 92/15, 23; 91/41
See application file for complete search history.

(56) References Cited

U.S. PATENT DOCUMENTS

| 3,444,783 A | * | 5/1969 | Fredd ................................ 91/41 |
| RE27,294 E | * | 2/1972 | Fredd ................................ 91/41 |
| 4,784,044 A | * | 11/1988 | Klement .......................... 92/24 |
| 5,349,894 A | * | 9/1994 | Greer ................................ 91/43 |
| 5,474,042 A | * | 12/1995 | Kaneda ....................... 123/196 S |
| 2004/0211313 A1 | * | 10/2004 | Yamaguchi ........................ 92/15 |
| 2009/0293978 A1 | * | 12/2009 | Lauterbach ..................... 138/31 |

FOREIGN PATENT DOCUMENTS

| DE | 10 2006 014756 | 10/2007 | |
| DE | 10 2007 000637 | 5/2008 | |
| DE | 102007000637 A1 | * 5/2008 | ............. F15B 15/26 |

* cited by examiner

*Primary Examiner* — Peter J Bertheaud
*Assistant Examiner* — Dominick L Plakkoottam
(74) *Attorney, Agent, or Firm* — Roylance, Abrams, Berdo and Goodman LLP

(57) ABSTRACT

A device for the pulsed release of an amount (3) of fluid that is stored in a storage housing (2) includes a piston (5) biased by a first spring (4) and movable within the storage housing (2) to dispense the fluid by the spring bias, when triggered by an actuator (6) to release a lock holding the piston in place (7). The lock (7) has individual catches (8) keeping the piston (5) in its pretensioned position and, when actuated by the actuator (6), releases the piston (5).

16 Claims, 4 Drawing Sheets

DEVICE FOR THE PULSED RELEASE OF AN AMOUNT OF FLUID THAT IS STORED IN A STORAGE HOUSING

FIELD OF THE INVENTION

The invention relates to a device for the pulsed release of an amount of fluid stored in a storage housing, in particular for implementing a start-stop function in automatic transmissions. A piston is supported against a first energy storage device with a capacity to move within the storage housing, and limits in conjunction with the storage housing the amount of fluid which can be held. When the piston is triggered by an actuator and released by a lock, the piston pushes the amount of fluid out of the storage housing in a pulsed manner. The lock has individual catches which in the locked position keep the piston in its pretensioned position, and which, when actuated by the actuator, release the piston in a release position.

BACKGROUND OF THE INVENTION

For reasons of saving fuel and minimizing pollutant emissions, in suitable operating states in modern motor vehicles, the internal combustion engine is shut off. To enable driving despite a engine start-stop function, a short starting process of the internal combustion engine and an immediate closed linkage in the transmission of the vehicle is necessary.

In prior art automatic transmissions of vehicles or, for example, in automatic gearboxes made with wet-running disk clutches, the clutches are adequately supplied with hydraulic fluid by a fluid supply only when the internal combustion engine is running. When a closed linkage is established in this transmission, first the clutch play must be overcome and the clutch or clutches must be completely closed by raising the fluid pressure. The equalization of the play of the clutch and its connection to the closed linkage are achieved by routing an amount of fluid into the piston space of the hydraulically triggerable clutches which are to be connected, the amount of fluid being made available by the fluid supply. When the vehicle starts off again after the internal combustion engine had been shut off, potentially a plurality of switching elements in the transmission are open and must be closed. As a result of this closing, an unduly long time interval can transpire until a completely closed linkage in the transmission is in fact established.

This disadvantage is resolved in prior art transmissions with a hydraulic pump driven by an electric motor and in which the delivery volume of the pump is independent of the speed of the internal combustion engine. In the absence of pressure supply by the main pump of the transmission in the hydraulic system, this hydraulic pump produces at least a pressure by which the clutch play can be equalized. The hydraulic pump which can be driven by the electric motor, however, leads to deterioration of the efficiency of the transmission and to increased cost of the transmission. Moreover, not inconsiderable additional installation space in motor vehicles and engineering effort are required for linking to the hydraulic system of the transmission and to an electrical control system.

DE 10 2006 014 756 A1 furthermore shows and describes a device for storage and for the pulsed release of an amount of hydraulic fluid for the transmission of a motor vehicle. A storage housing can be dynamically connected to the transmission for replacement of the amount of fluid and is bordered by the storage space and a movable limiting means formed as a piston. The piston is arranged so that it can be displaced within the storage space and is triggered by an actuator. The piston is furthermore held by a lock in its pretensioned position. For this purpose, the lock has catches keeping the piston in a pretensioned position against a first energy storage device formed as a compression spring. The lock can be moved by the actuator into a release position for the piston. The amount of fluid in this case is delivered pulsed into the transmission made, in particular, as an automatic transmission.

With such devices, essentially, amounts of fluid matched to the demand of a specific consumer can be set in a defined manner for obtaining a practical engine start-stop function for automatic transmissions. The prior art devices have at least a complex structure or require not inconsiderable installation space which, as a rule, only rarely is available in vehicles in the desired scope.

Furthermore, the lock and the actuator of these devices are generally often unnecessarily complex since the number of their parts is not exactly minimized with reference to representing the necessary functions.

SUMMARY OF THE INVENTION

An object of the invention is to provide an improved device where the pulsed release of an amount of fluid stored in a storage housing, in particular for implementation of a start-stop function in automatic transmissions is reliable, requires little installation space, can be easily produced, is especially durable and wear-resistant and, in particular, can ensure continuous operation, as this constitutes the start-stop function in automatic transmissions.

This object is basically achieved with a device where, in any travel position of the piston, the catches are at least partially in contact with the inside of the piston facing them. For locking of the piston, the catches act in that end region of the piston located adjacent to the stored amount of fluid, an additional component or several components for prepositioning of the catches and for ensuring reliable engagement of the catches with the catch surfaces for locking of the piston in a position in which the maximum of the amount of fluid is stored in the storage housing is not necessary. The piston of the device, due to its configuration according to the invention, undertakes prepositioning of the catches for purposes of their later locking.

The catches are held by the lock in this position relative to their storage housing. In the piston position in the storage housing corresponding to the maximum of the storable and retrievable amount of fluid, the catches engage that end region of the piston adjacent to the stored amount of fluid. The catches accordingly act in the pretensioned position of the piston in the vicinity of the back of the piston bottom. This configuration of the piston according to the invention thus effects an absolute maximum of the storable amount of fluid using the maximum possible travel path of the piston, associated with a minimum of required installation space and total number of parts of the device.

The device according to the invention makes an amount of fluid defined by the size of the storage space for supply of at least one consumer of an automatic transmission, and feeds it pulsed into the automatic transmission such that a time interval transpires which is not noticeable to the driver of the vehicle until transmission shifting functions or clutch functions are available after starting of the internal combustion engine of the vehicle. The device has a very reliable structure so that immediate readiness for driving after the internal combustion engine of the vehicle has been stopped is always possible over a long service life of the internal combustion engine.

Preferably the device has a holder for the catches which is part of the lock and is preferably fixed on the storage housing. The holder additionally assumes the function of guiding or positioning the actuator. Preferably, the holder is structured such that it guides at least components of the actuator or that the actuator triggering the catches is made to be displaceable relative to the holder. The device according to the invention for the pulsed release of an amount of fluid stored in the storage housing is thus characterized by multiple use of individual components relative to different functions combined in one component. This feature is advantageously reflected in the minimization of the number of parts, and thus, the production costs and installation costs. Moreover, problems in operation of the device according to the invention are virtually precluded due to the reduced number of parts.

As the aforementioned illustrates, the configuration of the piston improves operation of the device substantiated. Thus, in the end region of the piston along its inner wall side, preferably in the vicinity of the bottom of the piston, catch surfaces can be moved into locked engagement with the catches and hold, upon locking in the piston, against the action of the first energy storage device. The piston assumes a position corresponding to a maximum of the amount of fluid to be stored in the storage housing. The catches and the catch surfaces, likewise in its entirety as the lock as a whole with the actuator, are made wear-resistant such that they withstand the number of working cycles corresponding at least to the service life of that component of the hydraulic system, particularly an automatic transmission, with which the device interacts.

If locking of the piston on the holder of the catches is cancelled, the piston is moved pulsed with relief of the first energy storage device into a position in the storage housing corresponding to the minimum of the stored amount of fluid. The catches are moved into the locked position by the actuator which is preferably guided on the holder. The amount of fluid located in the storage housing is promptly expelled and is immediately available to a hydraulic consumer according to the demand for a starting function for the internal combustion engine of the vehicle.

The hydraulic consumer is thus virtually at the same time with the internal combustion engine in a ready-to-operate situation and is preferably able to implement shifting processes and the like in the automatic transmission. This ability enables operation of the vehicle with a start-stop function without a significant adverse effect on the driver.

Essentially, the actuator can form a hydraulically or pneumatically operating system or a mechanical system. In one especially preferred embodiment, a magnet system, preferably an electromagnet system, is used for actuating the actuation plunger. The actuator plunger can be moved both as an armature by an electromagnetic coil into one or more positions and can be kept therein. Advantageously, a second energy storage device keeps the actuation plunger in the initial state in the unactuated, preferably de-energized state of the electromagnetic coil. This initial state of the actuation plunger is preferably defined by the catches being engaged to the end region of the piston.

The catch surfaces, which interact with the catches on the holder for locking of the piston, are located on the end region of the inner periphery of the piston. They are formed especially preferably at the transition between the cylindrical guide surface on the inner periphery of the piston toward a catch chamber which widens in diameter. Preferably, the catch surfaces are oblique surfaces on which the catches can be moved from an unlocked position into a locked position and vice versa by sliding or rolling off. By choosing the angle of the oblique surfaces relative to the other cylindrical guide surfaces, quiet, reproducible locking can be achieved without any hindrance by clamping or inhibition of the catches. Moreover, this design measure enables virtually wear-free operation of the device over the long term.

Especially advantageously, the holder is made as a hollow cylinder located stationary relative to the storage housing and is directly and securely connected to it.

The holder for the catches advantageously takes over guidance of at least one actuation plunger of the actuation means. Other components of the actuation means which are not explicitly named can be guided on the holding means.

It is advantageous, especially when the holder is made as a hollow cylinder or as a bolt-like or pin-like element extending in the direction of motion of the piston, to form on the outer periphery of the holder a stop which comes into contact with one free end of the piston when the piston is in the position corresponding to the maximum of the volume of the amount of fluid in the storage housing. The piston can be supported on the stop in this position which it assumes for a pretensioned, first energy storage device. That way, the piston is always fixed in its two end positions in the storage housing such that, for example, vibrations, which are transferred to the device by operation of the internal combustion engine, do not generate any further operating noise of the device. Moreover, this arrangement ensures that a reproducibly exact storage volume of the amount of fluid can always be made available by the device.

The catches are preferably made as rolling elements, especially as catch balls. In particular, the standardized surface hardnesses of the rolling elements have a positive effect on serial production and the construction of the device. The rolling elements or catch balls can be easily accommodated in cage-like recesses in the holder and/or lock. It can be feasible, in a modified embodiment, instead of rolling elements to use, for example, rocker-like catch cams guided on their one free end in a receiver of the holder and supported with their other free end with the capacity to be triggered by the actuator. With catch cams that are produced specifically in their shape for the respective application, optimized, cam drive-like interaction of the catches with the actuator and the piston can be effected. As a result, the expulsion motion of the piston, and thus, the response speed of the device potentially are still further improved. In particular, in this way, smooth response behavior for the interlock is ensured.

Reliable operation of the device is further supported in that the first energy storage device is guided along the outer periphery of the piston by the piston and the holder and that the second energy storage device is guided in the holder, in particular in the hollow cylinder, and in doing so encompasses the actuation plunger. The energy storage devices are preferably made as compression springs and particularly as cylindrical helical compression springs. The spring turns can have a uniform spring constant or one which varies with the length of the springs to obtain optimized filling processes depending on the shape and type of the hydraulic consumer to be filled and to suppress the formation of gas bubbles, for example, in the consumers. This formation otherwise can lead to damaging cavitation effects in the hydraulic circuit.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure and which are schematic and not to scale.

DETAILED DESCRIPTION OF THE INVENTION

Figure 1:
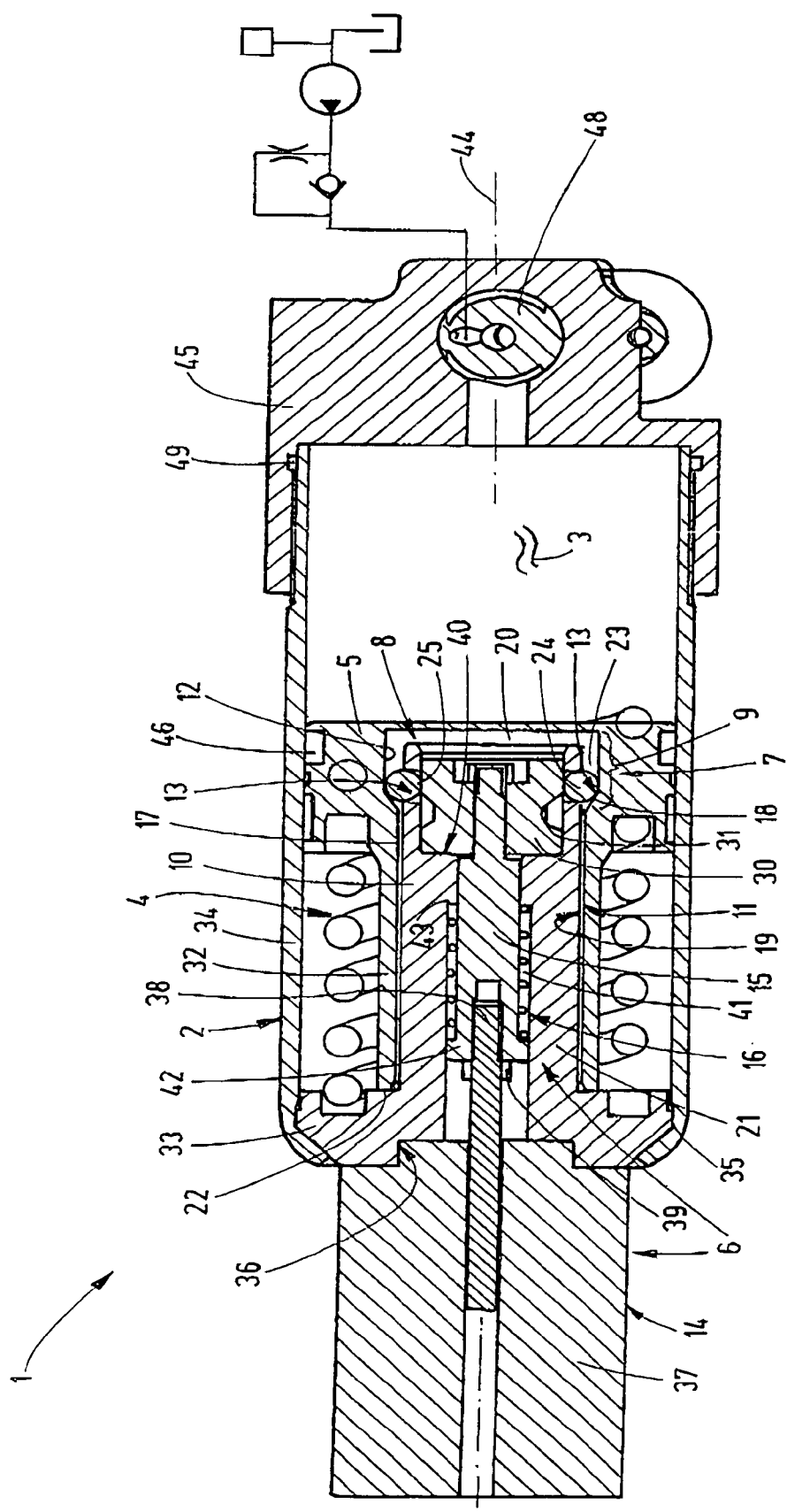
FIG. 1 is a side elevational view in section of a device for the pulsed release of an amount of fluid that is stored in a storage housing in the fluid-filled state according to a first embodiment of the invention.

FIG. 1 shows, in a longitudinal section, a device 1 for the pulsed release of an amount 3 of fluid that is stored in a storage housing 2. The device 1 is used to store a working agent for consumers of a hydraulic system (not detailed) used, for example, for storage and pulsed release of hydraulic fluid for the shifting cylinder of the automatic transmission of an automobile. Other applications are conceivable where it is crucial to have a specific amount of fluid made available in a pulsed manner.

The cylindrical storage housing 2 has a first energy storage device 4 made as a cylindrical compression spring. The energy storage device 4 is used to apply a definable compressive force to a piston 5, which force is sufficient to move, in a pulsed manner, the piston 5 out of a locked position, shown in FIG. 1, into a position in which the amount of fluid 3 is expelled from the storage housing 2 (compare FIG. 2). The amount of fluid 3 in the position of the piston 5 that is shown in FIG. 1 is delivered pressurized into the storage housing 2 by a conventional fluid conveying means, such as, for example, a rotary pump. The piston 5 is kept in the illustrated pretensioned position as shown in FIG. 1 by a lock 7 that holds the piston 5 with catches 8 after the filling process.

To achieve pulsed expulsion of the amount 3 of fluid from the storage housing 2, an actuator 6 can move the catches 8 into a position in which the locking on the end region 9 of the piston 5 is released. The end region 9 of the piston 5 which the catches 8 engage in the locked position of the piston 5 is located opposite the stored amount 3 of fluid, as a result of which the maximum travel path of the piston 5 in the storage housing 2 is enabled.

The catches 8 in the embodiments shown in FIGS. 1 to 4 are kept in a position that cannot be axially changed on the holder 11 that is made as a hollow cylinder 21. For temporary locking of the catches 8 to the piston 5 and for reliably assuming a releasable, pretensioned position of the piston 5, the piston 5, along its inner side 12, has catch surface 13 that can be moved into locking engagement with the catches 8 (compare FIG. 1).

Figure 2:
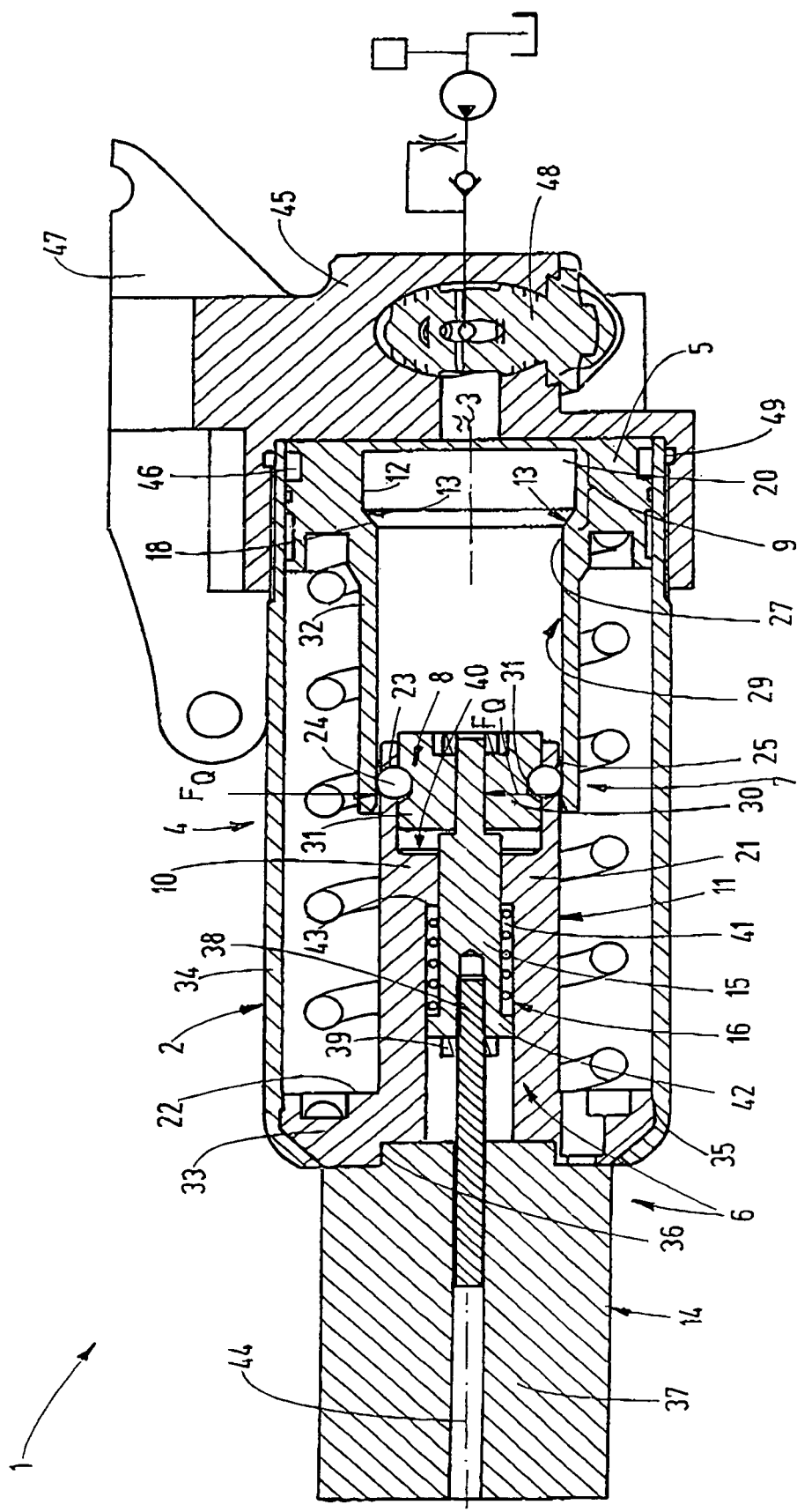
FIG. 2 is a side elevational view in section of the device of FIG. 1 in the emptied state.

The actuator 6 shown in FIGS. 1 to 4 is formed essentially from a multi-part, stepped, cylinder-like actuation plunger 15, which, axially guided by a magnet system 14, can be axially moved in the holder 11. FIG. 2 depicts the actuation plunger 15 in an initial state in which it is held by a second energy storage device 16 formed as a helical compression spring. The catches 8 disengage from the end region 9 of the piston 5. The second energy storage device 16 has a maximum length.

In the embodiments of the device 1 shown in FIGS. 1 to 4, the catch surfaces 13 are located along the cylindrical inner periphery 17 of the end region 9 of the piston 5 and are formed, in particular, by a linear transition 18 between the cylindrical guide surfaces 19 of the piston 5 and a catch chamber 20 which widens in diameter. Accordingly, the inner periphery 17 and the indicated inner side 12 form parts of the inner wall of the piston 5 facing the catches 8. The catch chamber 20 is in turn axially bordered by the bottom of the piston 5 so that overall a maximum possible travel path of the piston 5 is achieved before locking takes place here. The piston 5 in the locked position shown in FIG. 1, with its free end facing away from the amount 3 of fluid, adjoins a stop 22 on the outer periphery of the holder 11. In this way, piston 5 is held axially unable to move between the catch means 8 and the stop 22.

FIGS. 1 and 2 show examples in which the catches 8 are made as rolling elements 23, in particular catch balls 24, which in their axial positions are held by cage-like recesses 25 in the end region of the holder 11. The catch balls 24 are supported either radially on the catch surfaces 13 formed as roughly 45 degree oblique surfaces oriented away from the holder 11, on the end region 9 of the piston 5 forming the catch chamber 20 (compare FIG. 1), or the catch balls 24 are supported on the inner side 9 of the piston 5 on the cylindrical guide surfaces 19 of the piston 5 itself. Viewed radially in the direction to the actuation plunger 15, the catch balls 24 are supported on a cylindrical thickened control part 30 of the actuation plunger 15. The control part 30 has a peripheral groove 31 whose flanks form catch surfaces or oblique surfaces for changing the radial position of the catch balls 24. The oblique surfaces or flanks of the peripheral groove 31 in the control part 30 are shaped such that in a relative travelling motion of the control part 30 to the cage recesses 25 in the holder 11. The catch balls 24 are pressed radially to the outside, but remain in the recesses 25 as soon as the catch surfaces 13 in the catch chamber 20 of the piston 5 reach the vicinity of the recess 25 or are congruent to the cage-like recesses 25.

In the embodiments shown in FIGS. 1 to 4, the holder 11 is made as a cylinder having an outside diameter roughly half that of the storage housing 2. The piston 5 on its side facing away from the fluid amount 3 is shaped as a cylindrical sleeve 32. The sleeve 32 is connected in one piece to the piston 5. The sleeve 32 slides on the outer periphery of the holder 11. For the sake of simpler representation, the holder 11 is shown as made in one piece with the cover 33 that closes off the storage housing 2 on its end toward the magnet system 14. The wall 34 of the storage housing 3 is flanged with the cover 33. A radial peripheral bead 35 oriented toward the wall 34 on the cover 33 is fitted into the wall 34 to form an additional positive connection between the cover 33 and the wall 34.

Furthermore, the cover 33 has a cylindrical receiver 36 for centering the electromagnet 37 of the magnet system 14, which electromagnet is flanged to the cover 33. The actuation plunger 15 is connected by a set screw 38 to the armature of the magnet system 14 (not detailed) so that precision calibration of the position of the actuation plunger 15 relative to the holder 11 can take place. The set screw 38 is fixed by a lock nut 39 in contact with the actuation plunger 15.

FIG. 1 shows the electromagnet 37 in the de-energized state and the second energy storage device 16 in its extended position in which it pulls the control part 30 to an axial stop on the inner periphery of the holder 11. The stop 40 is located on the free end 10 of the holder 11. The second energy storage device 16 is a cylindrical compression spring located in a cylindrical spring space 41 between the actuation plunger 15 and the holder 11 and is supported on point 42 of the actuation plunger 15 and on the annular stop 43 of the holder 11. If the actuation plunger 15, as viewed in FIG. 1, is pushed to the right by the magnet system 14, the control part 30 is pushed in the same way to the right, and the catch balls 24 can reach the peripheral groove 31 in the control part 30 of the actuation plunger 15. This movement takes place under the action of transverse forces $F_Q$ (compare FIG. 2) acting continuously in the locked state of the piston 5 from its oblique catch surfaces 13 radially in the direction to the longitudinal axis 44 of the storage housing 2.

The piston 5 is released and moved in a pulsed manner to the right as far as its contact with a second cover 45 of the storage housing 2 under the action of the compressive force of the first energy storage device 4. The first energy storage device 4 is supported on the cover 33 and on the back of the piston 5 facing away from the fluid amount 3. The entire fluid amount 3 stored in the storage housing 2 is promptly expelled from the storage housing 2 and is supplied to a consumer in a manner which is not detailed (compare FIG. 2).

In all the illustrated embodiments, a sealing element 46 in the form of a piston ring is in the peripheral groove of the piston 5. The second cover 45 bears a flat flange 47 oriented in the direction of the longitudinal axis 44 for attachment of the device 1. Furthermore, the cover 45 with its thick-walled bottom forms a receiver for a screw-in valve 48 (not detailed) and possibly comprising a nonreturn valve and a pressure limiting valve or flow control valve. The cover 45 screwed on the storage housing 2 can be attached with the interposition of a sealing element 49, as is illustrated in FIGS. 1 to 4.

Figure 3:
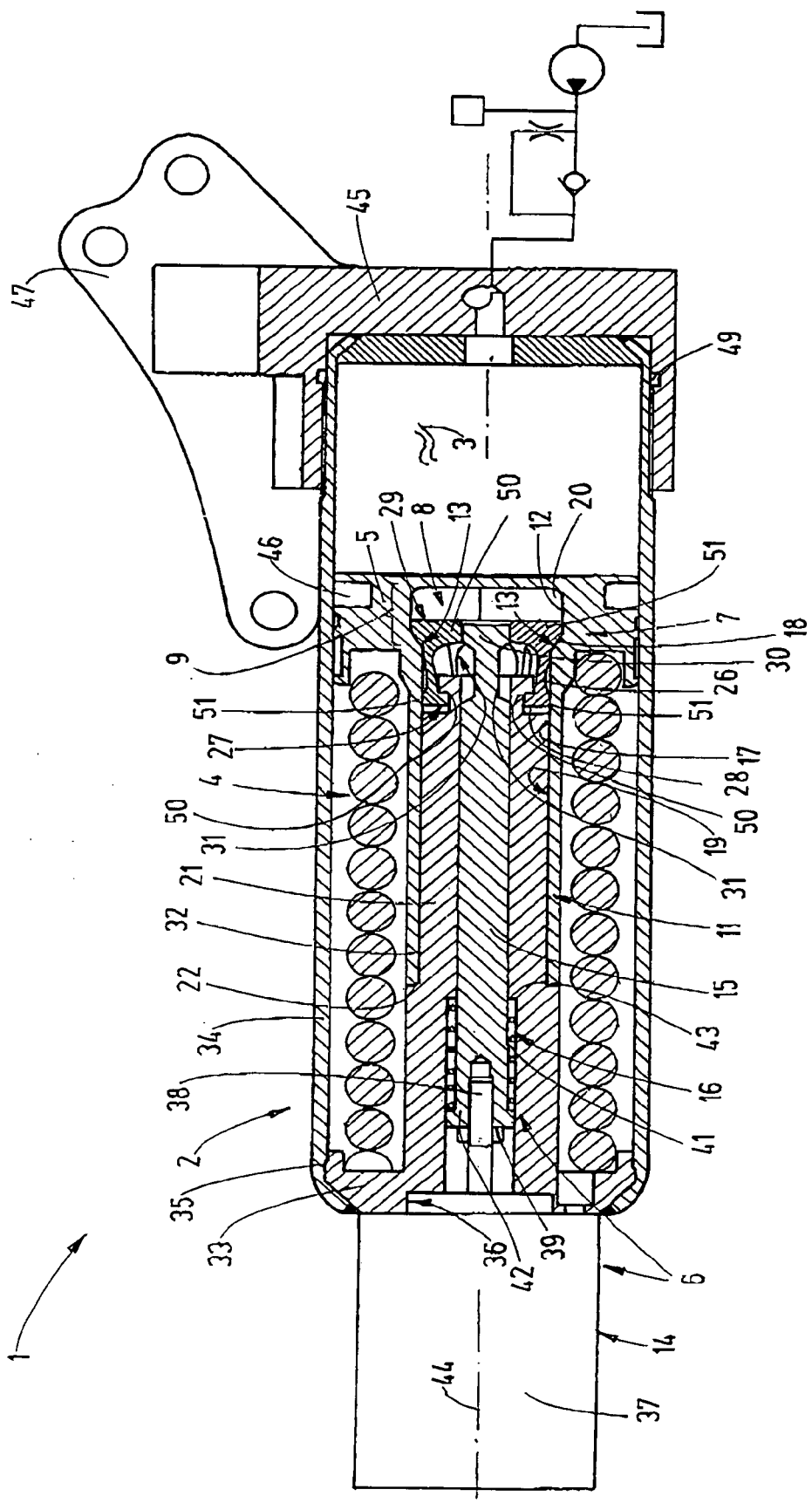
FIG. 3 is a side elevational view in section a device for the pulsed release of an amount of fluid that is stored in a storage housing according to a second embodiment of the invention.
Figure 4:
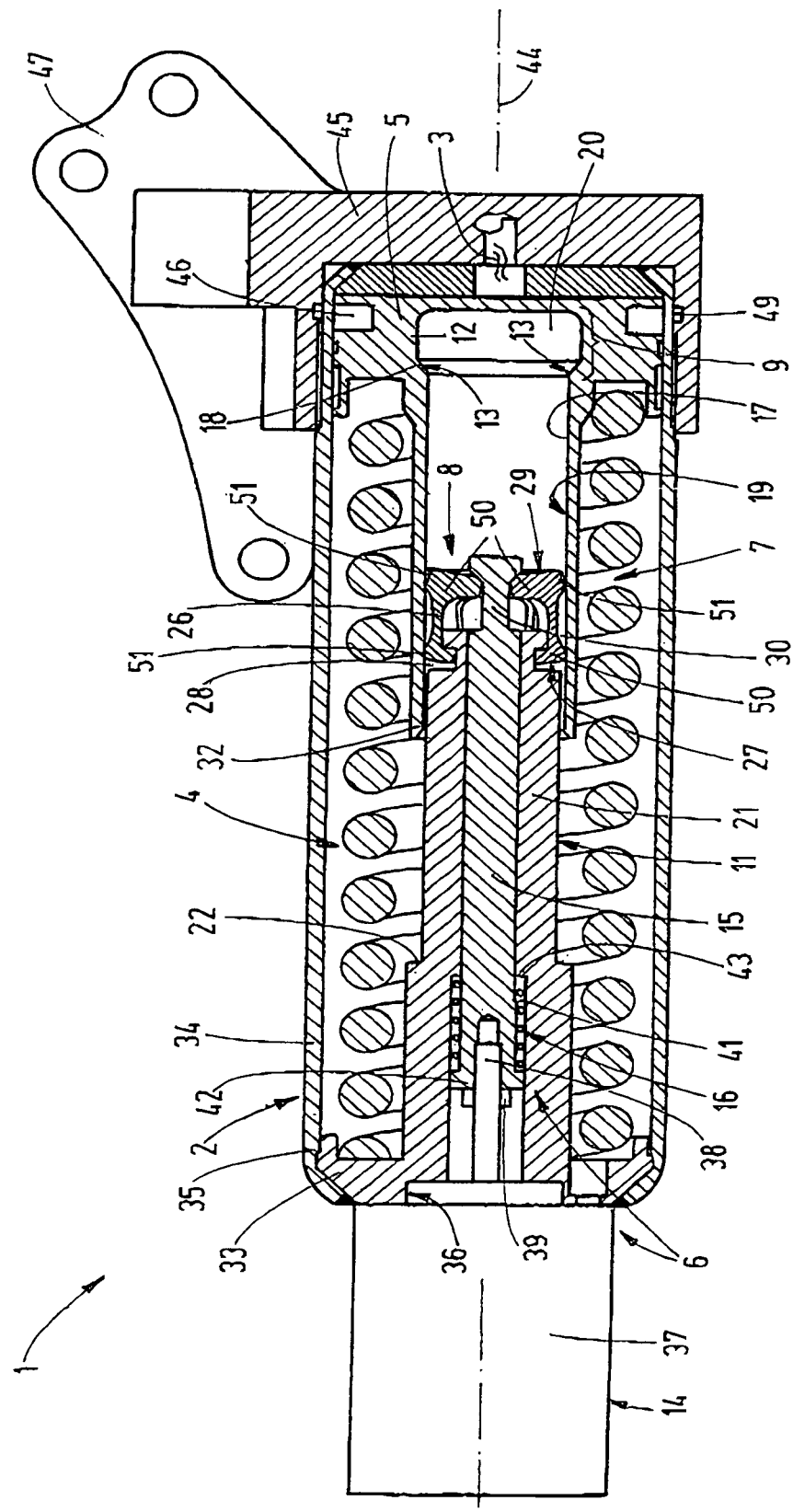
FIG. 4 is a side elevational view in section of the device of FIG. 3 in the emptied state.

FIGS. 3 and 4 each show a longitudinal section through a device 1 of essentially similar structure to that of FIGS. 1 and 2. The pulsed release of an amount 3 of fluid stored in a storage housing 2, however, differs from the embodiment as shown in FIGS. 1 and 2 in the structure of the holder 11, the lock 7 and the actuator.

The actuation plunger 15 over its length has an almost uniform outside diameter and is formed in one piece with its end-side control part 30. A peripheral groove 31 in the control part 30 has a greater width than in the embodiment as shown in FIGS. 1 and 2. The catches 18 are shaped as catch cams 26 made in the form of rockers and have a rail-like profile in the longitudinal section. The catch cams 26 have a first free end 27 held in a receiver 28 formed as a radially outer peripheral groove on the end 10 of the holder 11 so as to be able to pivot. With its respective other free end 29, the catch cams, of which only two of a plurality are shown, are guided to engage the peripheral groove 31 in the control part 30. The catch projections 50 of the catch cams 26, which projections engage the receiver 28 and the peripheral groove 31, are made asymmetrical. Smaller catch projections 51 are directed radially to the outside, with which the catch cams 26 can slide along the inner side 12 of the piston 5. FIG. 3 shows the position of the piston 5 corresponding to the maximum amount 3 of fluid in the storage housing 2. The actuation plunger 15, by expansion of the second energy storage device 16, assumes a position moved to the magnet system 14.

By this travelling motion of the actuation plunger 15, the catch projection 50 facing the piston 5 is displaced out of its position (compare FIG. 4) from the peripheral groove 31 and moves radially to the outside onto the catch surfaces 13 made as oblique surfaces in the catch chamber 20. This movement results in the piston 5 being locked. In FIG. 4 the actuation plunger 15 is moved to the right by the electromagnet 37, as viewed in FIG. 4. As a result of this movement, the catch projection 50 can drop into the peripheral groove 31 in the control part 30 of the actuation plunger 50 to release the piston 5. The piston 5 is then able to release the amount 3 of fluid in a pulsed manner under the action of the first energy storage device 4.

While various embodiments have been chosen to illustrate the invention, it will be understood by those skilled in the art that various changes and modifications can be made therein without departing from the scope of the invention as defined in the appended claims.

What is claimed is:

1. A device for pulsed release of stored fluid, comprising:
a storage housing having a fluid storage section therein;
a piston defining limits of said fluid storage section with said storage housing and being movably mounted in said storage housing between a locked position in which said fluid storage section has a maximum volume and a released position in which said fluid storage section has a minimum volume discharging fluid from said fluid storage section in a pulsed manner, said piston having an inside wall with an end region located adjacent to said fluid storage section;
a first energy storage device coupled to and biasing said piston toward the released position thereof by applying a force to said piston in a direction of the released position thereof;
a lock engaging said piston to retain said piston in the locked position thereof against biasing of said first energy storage device, said lock including individual catches facing and at least partially in contact with said inside wall in all positions of said piston in said storage housing, acting in said end region, and being retained by a holder against axial movement in said storage housing, said lock being unbiased by said first energy storage device; and
an actuator coupled to said lock to disengage said lock from said piston allowing said piston to move from the locked position thereof to the released position thereof.

2. A device according to claim 1 wherein
said catches are held on a free end of said holder; and
said actuator is movable relative to said holder.

3. A device according to claim 1 wherein
an inner side of said end region of said piston comprises catch surfaces engaged with said catches in the locked position of said piston.

4. A device according to claim 3 wherein
disengagement of said catches from said catch surfaces by said actuator releases said piston for movement from the locked position thereof to the released position thereof.

5. A device according to claim 1 wherein
said actuator comprises an actuation plunger actuated by a magnet system and coupled to and biased by a second energy storage device to an initial position thereof without the magnet system being actuated and with said catches engaging said end region of said piston to retain said piston in the locked position thereof.

6. A device according to claim 3 wherein
said catch surfaces are formed by a transition between a cylindrical guide surface for said catches and a catch chamber widening in diameter relative to said guide surface.

7. A device according to claim 1 wherein
said holder comprises a hollow cylinder securely and fixedly connected to said storage housing; and
said actuator comprises an actuation plunger guided for movement in said hollow cylinder.

8. A device according to claim 3 wherein
said holder comprises a stop along its outer periphery contacting a free end of said piston facing said stop under biasing of said first energy storage device in the locked position of said piston.

9. A device according to claim 1 wherein
said catches comprise rolling elements held in cage recesses in said holder.

10. A device according to claim 9 wherein said rolling elements are catch balls.

11. A device according to claim 1 wherein said catches comprise rocker catch cams having first free ends guided in a receiver of said holder and second free ends actuatable by said actuator.

12. A device according to claim 5 wherein
said first energy storage device is guided along an outer periphery of said piston; and
said second energy storage device is guided in said holder and encompasses said actuator.

13. A device according to claim 1 wherein said first energy storage device comprises a compression spring.

14. A device according to claim 13 wherein said compression spring directly engages said piston.

15. A device according to claim 1 wherein said first energy storage device directly engages said piston.

16. A device according to claim 1 wherein said end region of said piston is closer to said fluid storage region than to an opposite end of said piston.

* * * * *